(12) United States Patent
Ikeda et al.

(10) Patent No.: US 11,721,026 B2
(45) Date of Patent: Aug. 8, 2023

(54) INFORMATION PROCESSING APPARATUS, INFORMATION PROCESSING METHOD, AND INFORMATION PROCESSING SYSTEM

(71) Applicant: SONY CORPORATION, Tokyo (JP)

(72) Inventors: Hiroshi Ikeda, Tokyo (JP); Seijiro Inaba, Kanagawa (JP); Nobuho Ikeda, Kanagawa (JP); Yuta Nakao, Kanagawa (JP); Hideyuki Sato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/477,603

(22) PCT Filed: Nov. 7, 2017

(86) PCT No.: PCT/JP2017/040054
§ 371 (c)(1),
(2) Date: Jul. 12, 2019

(87) PCT Pub. No.: WO2018/135095
PCT Pub. Date: Jul. 26, 2018

(65) Prior Publication Data
US 2019/0340769 A1 Nov. 7, 2019

(30) Foreign Application Priority Data

Jan. 20, 2017 (JP) .................. 2017-008081

(51) Int. Cl.
*G06T 7/20* (2017.01)
*G06V 20/40* (2022.01)
(Continued)

(52) U.S. Cl.
CPC .............. *G06T 7/20* (2013.01); *G06V 20/42* (2022.01); *G06V 40/20* (2022.01); *H04N 23/695* (2023.01);
(Continued)

(58) Field of Classification Search
CPC ............. G06T 7/20; G06T 2207/30221; G06T 2207/30241; G06T 2207/10016;
(Continued)

(56) References Cited

U.S. PATENT DOCUMENTS

2011/0135149 A1* 6/2011 Gefen ................... G01S 5/0257
382/103
2011/0205358 A1 8/2011 Aota et al.
(Continued)

FOREIGN PATENT DOCUMENTS

CN 101681549 A 3/2010
JP 10-276351 A 10/1998
(Continued)

OTHER PUBLICATIONS

International Search Report dated Jan. 9, 2018 in PCT/JP2017/040054 filed on Nov. 7, 2017.
(Continued)

*Primary Examiner* — Amandeep Saini
(74) *Attorney, Agent, or Firm* — Oblon, McClelland, Maier & Neustadt, L.L.P.

(57) ABSTRACT

There is provided an information processing apparatus including a processing unit that tracks a target on the basis of a captured image that has been captured by an imaging device and sensor information obtained by communication from a sensor that senses the target.

16 Claims, 5 Drawing Sheets

(51) Int. Cl.
*G06V 40/20* (2022.01)
*H04N 23/695* (2023.01)

(52) U.S. Cl.
CPC .............. *G06T 2207/30221* (2013.01); *G06T 2207/30241* (2013.01)

(58) Field of Classification Search
CPC ...... G06T 2207/30196; H04N 5/23299; H04N 5/232; H04N 7/18; G06K 9/00335; G06K 9/00724
USPC ........................................................ 382/103
See application file for complete search history.

(56) References Cited

U.S. PATENT DOCUMENTS

| | | | | |
|---|---|---|---|---|
| 2012/0237081 A1* | 9/2012 | Datta | ..................... | G06V 20/53 382/103 |
| 2014/0049769 A1* | 2/2014 | Zheleznyak | ......... | G06V 20/653 356/28 |
| 2015/0120543 A1* | 4/2015 | Carnesi, Sr. | ....... | G06Q 20/1085 382/117 |
| 2017/0345162 A1* | 11/2017 | Bamba | ................... | G06V 20/46 |

FOREIGN PATENT DOCUMENTS

| | | | | |
|---|---|---|---|---|
| JP | 2016-186740 A | 10/2016 | | |
| WO | WO 2009/113265 A1 | 9/2009 | | |
| WO | WO-2016104831 A1 * | 6/2016 | ............... | G06T 7/20 |

OTHER PUBLICATIONS

Extended European Search report dated Oct. 1, 2019 in European Patent Application No. 17893139.0, 7 pages.

* cited by examiner

INFORMATION PROCESSING APPARATUS, INFORMATION PROCESSING METHOD, AND INFORMATION PROCESSING SYSTEM

TECHNICAL FIELD

The present disclosure relates to an information processing apparatus, an information processing method, and an information processing system.

BACKGROUND ART

A technology has been developed in which the position of a set tracking target is superimposed and displayed on a competition area image obtained by imaging a competition area of a sport competition. An example of the above technology is a technology described in the following Patent Document 1.

CITATION LIST

Patent Document

Patent Document 1: Japanese Patent Application Laid-Open No. 10-276351

SUMMARY OF THE INVENTION

Problems to be Solved by the Invention

For example, a captured image (moving image or still image) that has been captured by an imaging device is used for various purposes such as analysis of sport games and crime prevention. Examples of using a captured image include an example described in Patent Document 1, in which the tracking target position is superimposed and displayed on a competition area image obtained by imaging a competition area.

Taking sports as an example, in a case where a captured image is used, it is possible to detect and track a target to be tracked (hereinafter simply referred to as a "target") such as a player or a ball on the basis of the captured image. However, in the case of simply tracking a target on the basis of the captured image, erroneous detection or erroneous tracking of the target might occur due to concentration of the tracking targets such as concentration of players or concentration of balls, for example. Therefore, it is not always possible to track the target with accuracy simply by tracking the target on the basis of a captured image.

The present disclosure proposes a novel and improved information processing apparatus, information processing method, and information processing system capable of improving accuracy in tracking a target on the basis of a captured image.

Solutions to Problems

According to the present disclosure, there is provided an information processing apparatus including a processing unit that tracks a target on the basis of a captured image that has been captured by an imaging device and sensor information obtained by communication from a sensor that senses the target.

Furthermore, according to the present disclosure, there is provided an information processing apparatus including a processing unit that identifies the target on the basis of a captured image that has been captured by an imaging device and sensor information obtained by communication from a sensor that senses the target.

Furthermore, according to the present disclosure, there is provided an information processing method to be executed by an information processing apparatus, the method including a step of tracking a target on the basis of a captured image that has been captured by an imaging device and sensor information obtained by communication from a sensor that senses the target.

Furthermore, according to the present disclosure, there is provided an information processing method to be executed by an information processing apparatus, the method including a step of identifying a target on the basis of a captured image that has been captured by the imaging device and sensor information obtained by communication from a sensor that senses the target.

Furthermore, according to the present disclosure, there is provided an information processing system including an information processing apparatus including: an imaging device; a sensor that senses a target; and a processing unit that tracks the target on the basis of a captured image that has been captured by the imaging device and sensor information obtained by communication from the sensor.

Effects of the Invention

According to the present disclosure, it is possible to improve accuracy in tracking a target on the basis of a captured image.

Note that the above-described effect is not necessarily limited, and it is also possible to exhibit any one of the effects illustrated in this specification together with the above-described effect or in place of the above-described effect, or other effects that can be assumed from this specification.

MODE FOR CARRYING OUT THE INVENTION

Figure 1:
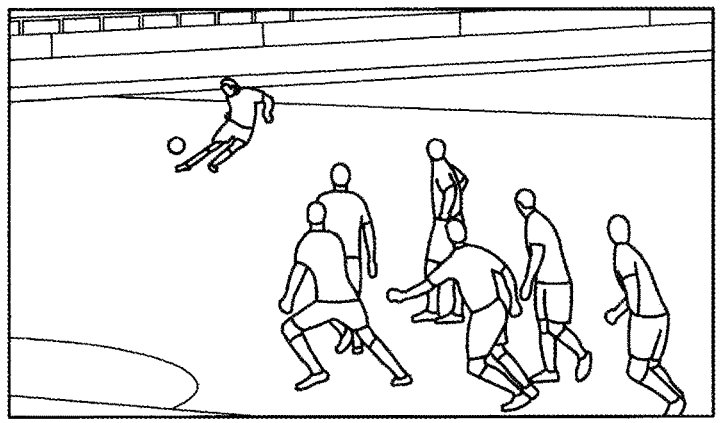
FIG. 1 is an explanatory view illustrating an exemplary case where it is not possible to track a target with accuracy simply by tracking the target on the basis of a captured image.

Hereinafter, preferred embodiments of the present disclosure will be described in detail with reference to the accompanying drawings. Note that same reference numerals are assigned to constituent elements having substantially the same functional configuration, and redundant description is omitted in the present specification and the drawings.

Furthermore, description will be given in the order indicated below.

1. Information processing method according to the present embodiment
2. Information processing system according to the present embodiment
3. Program according to the present embodiment (Information Processing Method According to the Present Embodiment)

First, an information processing method according to the present embodiment will be described. Hereinafter, processing according to the information processing method of the present embodiment will be described by using an exemplary case where the processing is performed by an information processing apparatus according to the present embodiment.

As described above, it is not always possible to track the target with accuracy simply by tracking the target on the basis of a captured image.

Figure 2:
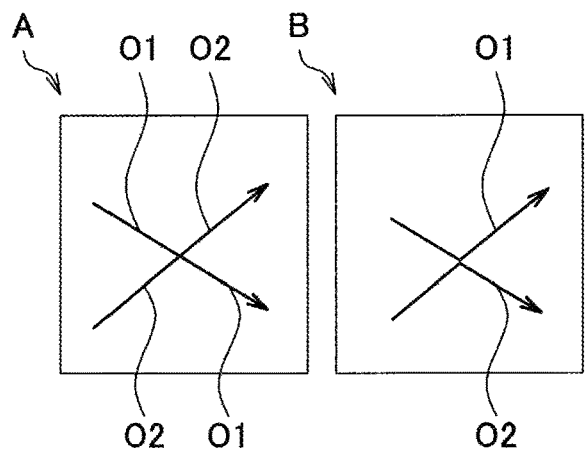
FIG. 2 is an explanatory view illustrating an exemplary case where it is not possible to track a target with accuracy simply by tracking the target on the basis of a captured image.

FIGS. 1 and 2 are explanatory views illustrating an exemplary case where it is not possible to track a target with accuracy simply by tracking the target on the basis of a captured image. FIG. 1 illustrates an example of a captured image including an image of a soccer game (an example of sport). Furthermore, A of FIG. 2 illustrates an example of trajectory of each of a target O1 and a target O2, and B of FIG. 2 illustrates another example of trajectory of each of the target O1 and the target O2.

For example, as illustrated in FIG. 1, in a case where players (an example of a target, hereinafter, the same will be applied) is concentrated, that is, in a case where the targets mutually overlap in the captured image, detecting the target might not be possible in some cases. The case where detecting the target is not possible as described above would lead to degradation of target tracking accuracy, such as a failure in tracking the target, or occurrence of erroneous tracking.

Furthermore, for example, in a case where players of the same team intersect each other, it is not always possible to uniquely distinguish whether the state is state A in FIG. 2 or state B in FIG. 2 simply by processing the captured image. Therefore, for example, intersection of the players of the same team each other would lead to an occurrence of erroneous detection of the target, and this might cause degradation of target tracking accuracy, such as occurrence of erroneous tracking.

Furthermore, for example, in a case where it is not possible to detect a region used for determination of a target such as a player's face or a uniform number in a captured image, or the resolution of the captured image is insufficient (resolution of the captured image is not high enough to determine the target), identification of the target would not be possible. The case where it is not possible to identify the target as described above might lead to degradation of target tracking accuracy, such as occurrence of erroneous tracking.

As described above, the case of tracking the target simply using the captured image as a basis would not always be able to track the target with accuracy.

Furthermore, as another method for tracking the target, it is conceivable to apply a method using detection results of inertial sensors. Examples of the inertial sensor include one or two or more sensors including an acceleration sensor, an angular velocity sensor, and a geomagnetic sensor.

In the case of using a detection result of the inertial sensor, it is possible to estimate a movement amount of the target and a position of the target without being influenced by factors that can affect the target tracking based on the captured image, such as occlusion and the distance between the targets. For example, it is possible to estimate the movement amount of the target by integrating the acceleration obtained from the inertial sensor twice, or acceleration obtained from the inertial sensor can be used to estimate the number of steps of the target, leading to estimation of the movement amount of the target. Furthermore, with estimation of the movement amount of the target, it would be possible to estimate the position of the target recognized as existing at a certain position.

However, in a case where the detection result of the inertial sensor is used, it is not possible to obtain the absolute position of the target, and moreover, the error between the estimated movement amount and position from the actual movement amount and position increases with the lapse of time.

Accordingly, it would not be always possible to track the target with accuracy simply by using the detection result of the inertial sensor.

To overcome this, the information processing apparatus according to the present embodiment performs any of the processing (1) to (3) illustrated below to improve tracking accuracy in the case of tracking the target on the basis of the captured image.

(1) Processing According to First Information Processing Method: Target Tracking Processing An information processing apparatus according to the present embodiment tracks a target on the basis of a captured image that has been captured an imaging device and sensor information obtained by communication from a sensor that senses the target.

The imaging device according to the present embodiment may be an imaging device external to the information processing apparatus according to the present embodiment or may be an imaging device included in the information processing apparatus according to the present embodiment. In a case where the imaging device according to the present embodiment is an external imaging device, the information processing apparatus according to the present embodiment communicates with the imaging device and thereby obtains a captured image generated in the imaging device.

The imaging device images a region including an imageable range of a target, such as "court or ground (an exemplary case where the purpose is sport game analysis)", or "a space to undergo crime prevention measures (an example of crime prevention purpose), for example.

Examples of the sensor according to the present embodiment include any sensor capable of sensing one or both of the movement and the position of the target, such as one or both of an inertial sensor and a position sensor. Examples of the position sensor include a "sensor that detects an absolute position like a global navigation satellite system (GNSS) device" or a "device that estimates a position by using a certain communication scheme, such as a device that estimates a position by using a wireless communication scheme, such as "Ultra Wide Band (UWB)".

The sensor according to the present embodiment is provided on an object (for example, shoes, clothes, an accessory such as a wrist watch, or an arbitrary wearable device) worn on a target person such as a player, or provided in a target object such as a ball, for example. Note that the sensor according to the present embodiment may be provided by any method capable of sensing a target, such as being embedded in a target object (including living body), for example.

Identification of the target according to the present embodiment is performed by being assigned with identification information, for example. An example of the identification information according to the present embodiment is data in a certain format, capable of identifying a target, such as an ID, for example.

The information processing apparatus according to the present embodiment detects a trajectory of a movement of a target to which identification information is assigned (hereinafter referred to as a "target's trajectory"), for example, and thereby racks the target. For example, the information processing apparatus according to the present embodiment detects a target to which identification information is assigned from a captured image and then obtains the moving trajectory of the detected target, thereby obtaining the target's trajectory. Note that the method of detecting the target's trajectory is not limited to the example described above. The information processing apparatus according to the present embodiment can detect the target's trajectory using an arbitrary method capable of obtaining the trajectory.

Here, identification of the target is performed by processing (2) which will be described later, for example. Note that identification of the target may be performed by predetermined operation such as operation of assigning identification information by the user of the information processing apparatus according to the present embodiment, for example.

More specifically, the information processing apparatus according to the present embodiment tracks a target, on the basis of a captured image.

The information processing apparatus according to the present embodiment detects a target from a captured image and thereby tracks the target. The information processing apparatus according to the present embodiment performs certain processing capable of detecting a target from a captured image, such as detection of a predetermined region in a target such as a face or a uniform number from a captured image, or detection of a pattern of a specific color (for example, a uniform, etc.) from the captured image, or a combination of these, for example, and thereby detects the target.

As described above, it is not always possible to track the target with accuracy simply by tracking the target on the basis of a captured image.

Therefore, the information processing apparatus according to the present embodiment tracks a target on the basis of sensor information in a case where it is not possible to perform tracking on the basis of the captured image. Note that the information processing apparatus according to the present embodiment may track the target on the basis of both the captured image and the sensor information.

Here, examples of cases where it not possible to perform tracking on the basis of the captured image include a case of being in a non-detection state and a case of being in a non-determination state.

The non-detection state according to the present embodiment is a state in which a target identified on the basis of a captured image cannot be detected. The information processing apparatus according to the present embodiment judges that a target is in a non-detection state in a case where the state in which the target identified on the basis of a captured image cannot be detected is greater than a set period, for example.

Furthermore, the non-determination state according to the present embodiment is a state in which the identification information assigned to the target cannot be determined on the basis of the captured image. An example of the non-determination state is "a state in which a target has been detected but the detected target cannot be uniquely determined", as illustrated in FIG. 2, for example.

The information processing apparatus according to the present embodiment judges whether or not the target is in a non-determination state on the basis of a distance between the target to which the identification information is assigned and another target, for example. The information processing apparatus according to the present embodiment judges that the target is in the non-determination state in a case where the distance between the target to which identification information is assigned and another target is a set threshold or less, or in a case where the distance is less than the threshold, for example.

Here, the threshold for determination of the non-determination state may be a fixed value that is set in advance, or may be a variable value that can be changed by operation of the user of the information processing apparatus according to the present embodiment, or the like.

The information processing apparatus according to the present embodiment performs tracking of the target on the basis of a captured image and sensor information, for example, by performing one or both of processing (1-1) and processing (1-2) described below.

(1-1) First Example of Processing for Tracking Target: Processing in a Case where the Target is Judged to be in Non-Detection State In a case where the target is in the non-detection state, the information processing apparatus according to the present embodiment interpolates the target's trajectory on the basis of sensor information and thereby tracks the target. That is, the information processing apparatus according to the present embodiment interpolates the movement of the target on the basis of the sensor information and thereby cancels the non-detection state.

Figure 3:
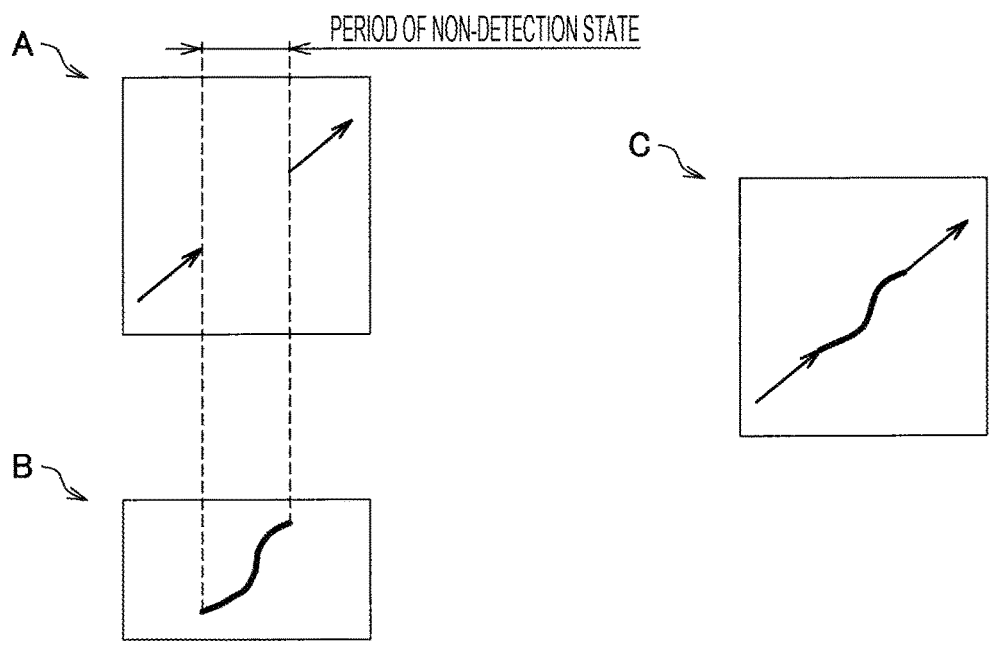
FIG. 3 is an explanatory view illustrating a first example of processing of tracking a target according to an information processing method of the present embodiment.

FIG. 3 is an explanatory view illustrating a first example of processing of tracking a target in an information processing method according to the present embodiment. A of FIG. 3 illustrates an example of a target's trajectory in a certain period including a period judged to be in a non-detection state. B of FIG. 3 illustrates an example of a target's trajectory estimated on the basis of the sensor information in the period judged to be in the non-detection state. Furthermore, C of FIG. 3 illustrates an example of a result of interpolation of the target's trajectory in the period judged to be in the non-detection state illustrated in A of FIG. 3 using the target's trajectory estimated on the basis of the sensor information illustrated in B of FIG. 3.

For example, as illustrated in FIG. 3, the "target's trajectory in the period judged to be in the non-detection state", that is, "the target's trajectory in the period in which the target is lost as a result of processing the captured image" is interpolated by the target's trajectory estimated on the basis of the sensor information. The information processing apparatus according to the present embodiment refers to each of a timestamp of the captured image and a timestamp of the sensor information, for example, and thereby interpolates the target's trajectory in a period judged to be in the non-detection state by the target's trajectory estimated on the basis of the sensor information.

For example, the information processing apparatus according to the present embodiment combines the target's trajectory based on the captured image illustrated in A of FIG. 3 with the target's trajectory estimated on the basis of the sensor information illustrated in B of FIG. 3, and thereby interpolates the target's trajectory. The information processing apparatus according to the present embodiment applies affine transformation, the Kalman filter, or the like, for example, on the target's trajectory estimated on the basis of the sensor information, and thereby combines the target's trajectory based on the captured image illustrated in A of FIG. 3 with the target's trajectory estimated on the basis of the sensor information illustrated in B of FIG. 3.

(1-2) Second Example of Processing for Tracking Target: Processing After Target Enters Non-Determination State After the target enters the non-determination state, the information processing apparatus according to the present embodiment newly assigns identification information to the target on the basis of the sensor information and thereby tracks the identified object. Newly assigning the identification information to the target makes it possible to turn the target into an identifiable state. That is, the information processing apparatus according to the present embodiment cancels the non-determination state by determining the target on the basis of the sensor information.

As described above, the information processing apparatus according to the present embodiment judges that the target is in the non-determination state in a case where the distance between the target to which identification information is assigned and another target is a set threshold or less, or in a case where the distance is less than the threshold. The state after judgment of a non-determination state corresponds to the state after the target turns into the non-determination state.

Furthermore, in a case where "the distance between the target to which the identification information has been assigned and another target is greater than the threshold after judgment of non-determination state" or "the distance between the target to which the identification information has been assigned and another target is the threshold or more after judgment of non-determination state", for example, the information processing apparatus according to the present embodiment newly assigns identification information to the target on the basis of sensor information and then determines the target.

Figure 4:
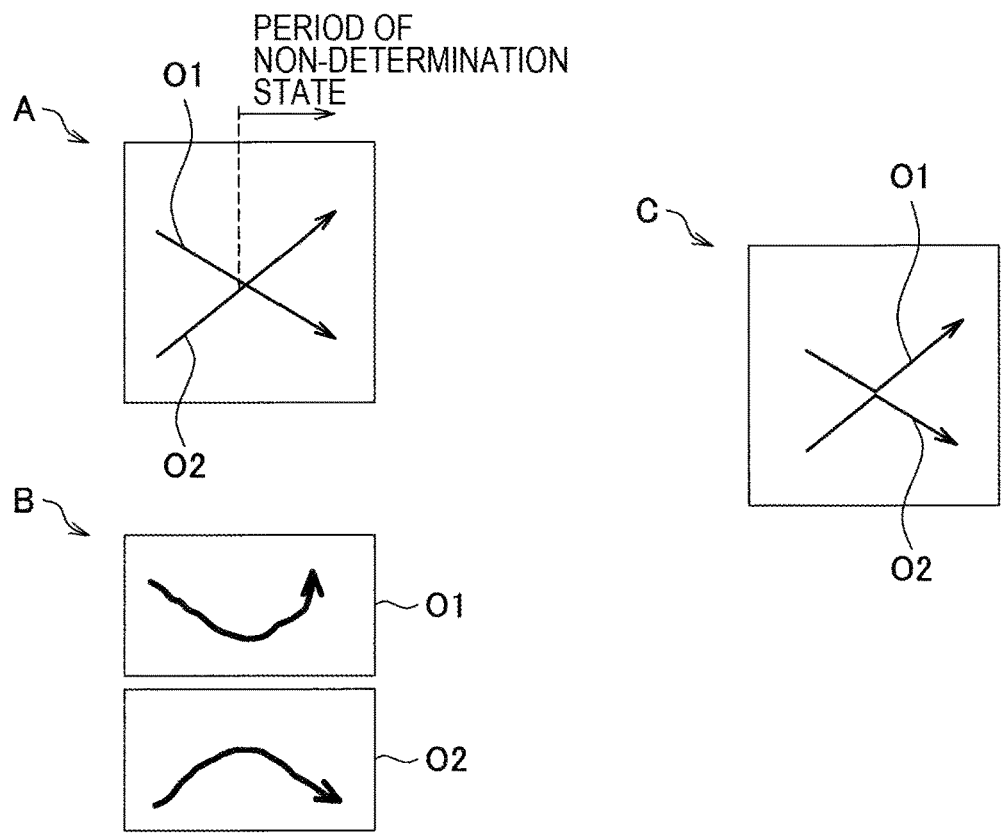
FIG. 4 is an explanatory view illustrating a second example of processing of tracking a target according to an information processing method of the present embodiment.

FIG. 4 is an explanatory view illustrating a second example of processing of tracking a target in an information processing method according to the present embodiment. A of FIG. 4 illustrates an example of a target's trajectory in a certain period including a period judged to be in a non-determination state. B of FIG. 4 illustrates an example of a target's trajectory estimated on the basis of the sensor information in the certain period. Furthermore, C of FIG. 4 illustrates an example of a state in which the non-determination state has been cancelled by determining the target on the basis of the sensor information.

For example, using the target's trajectory estimated on the basis of the sensor information as illustrated in B of FIG. 4 would make it possible to determine the movement of the target in the non-determination state. Accordingly, the information processing apparatus according to the present embodiment can cancel the non-determination state.

Figure 5:
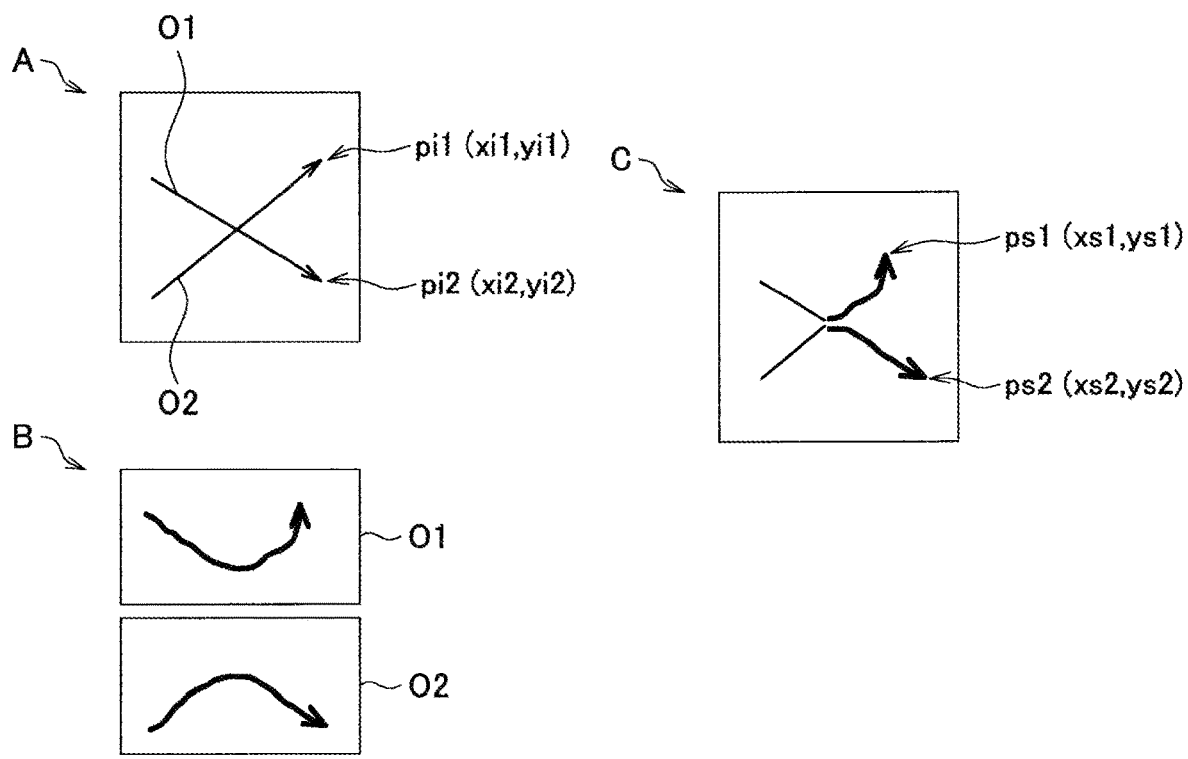
FIG. 5 is an explanatory view illustrating a second example of processing of tracking a target according to an information processing method of the present embodiment.

FIG. 5 is an explanatory view illustrating a second example of processing of tracking a target in an information processing method according to the present embodiment, more specifically illustrating an example of the processing for cancelling the non-determination state illustrated in FIG. 4. A of FIG. 5 illustrates an example of a target's trajectory in a certain period including a period judged to be in a non-determination state, similarly to A of FIG. 4. B of FIG. 5 illustrates an example of a target's trajectory estimated on the basis of the sensor information in the certain period, similarly to B of FIG. 4. Furthermore, C of FIG. 5 illustrates an example of a state in which the non-determination state has been cancelled by determining the target on the basis of the sensor information, similarly to C of FIG. 4.

As illustrated in A of FIG. 5, the information processing apparatus according to the present embodiment sets pi1 (xi1, yi1), and pi2 (xi2, yi2) as the two-dimensional positions of each of the target, obtained from the captured image.

Furthermore, as illustrated in C of FIG. 5, in a case where the distance between the target to which the identification information has been assigned and another target is greater than the threshold after judgment of non-determination state (or the distance between the target to which the identification information has been assigned and another target is the threshold or more after judgment of non-determination state), the information processing apparatus according to the present embodiment interpolates the target's trajectory based on the captured image illustrated in A of FIG. 5 with the target's trajectory estimated on the basis of the sensor information illustrated in B of FIG. 5. As illustrated in C of FIG. 5, the information processing apparatus according to the present embodiment sets the two-dimensional positions of each of the targets after interpolation as ps1 (xs1,ys1), and ps2 (xs2,ys2).

Subsequently, the information processing apparatus according to the present embodiment obtains a combination having the minimum distance among combinations of distances between pi1 and pi2 and ps1 and ps2, and then, sets the two-dimensional position indicated by the obtained combination as a position of each of the targets. The information processing apparatus according to the present embodiment uses a Hungarian method or the like, for example, and obtains a combination that minimizes the above distance.

The information processing apparatus according to the present embodiment performs one or both of the processing of (1-1) and the processing of (1-2), for example, and thereby tracks a target on the basis of a captured image and sensor information.

Here, for example, performing the processing of (1-1) above cancels the non-detection state as illustrated in C of FIG. 3, and performing the processing of (1-2) above cancels the non-determination state as illustrated in C of FIG. 4.

Accordingly, the information processing apparatus according to the present embodiment performs the processing (processing of tracking the target) according to a first information processing method, making it possible to improve the accuracy in tracking the target on the basis of the captured image.

Furthermore, with the improved accuracy in tracking a target on the basis of a captured image, it is possible to further reduce the probability of occurrence of a situation that needs manual correction in target tracking. Accordingly, the information processing apparatus according to the present embodiment performs the processing (processing of tracking the target) according to the first information processing method, making it possible to improve the convenience in tracking the target, on the basis of the captured image.

(2) Processing According to Second Information Processing Method: Target Identification Processing The information processing apparatus according to the present embodiment identifies a target on the basis of a captured image and sensor information.

More specifically, the information processing apparatus according to the present embodiment associates an event detected on the basis of the captured image with an event detected on the basis of the sensor information, and thereby identifies the target. The information processing apparatus according to the present embodiment refers to each of the timestamp of the captured image and the timestamp of the sensor information, for example, and associates the events that occurred at the same timepoint (or a preset period that can be regarded as the same timepoint. The same applies to the following description) with each other.

Examples of the event accord in to the present embodiment include "a play action set in sports such as kicking a ball, hitting a ball, swinging has been performed" (an exemplary event in a case where the information processing method according to the present embodiment is applied to analysis of a sport game, for example), "a predetermined action that is set, such as changing from a walking state to a running state, frequently looking around the surroundings has been performed" (an exemplary event in a case where the information processing method according to the present embodiment is applied to crime prevention, for example), or the like. Note that the example of the event according to the present embodiment is, of course, not limited to the example described above.

Figure 6:
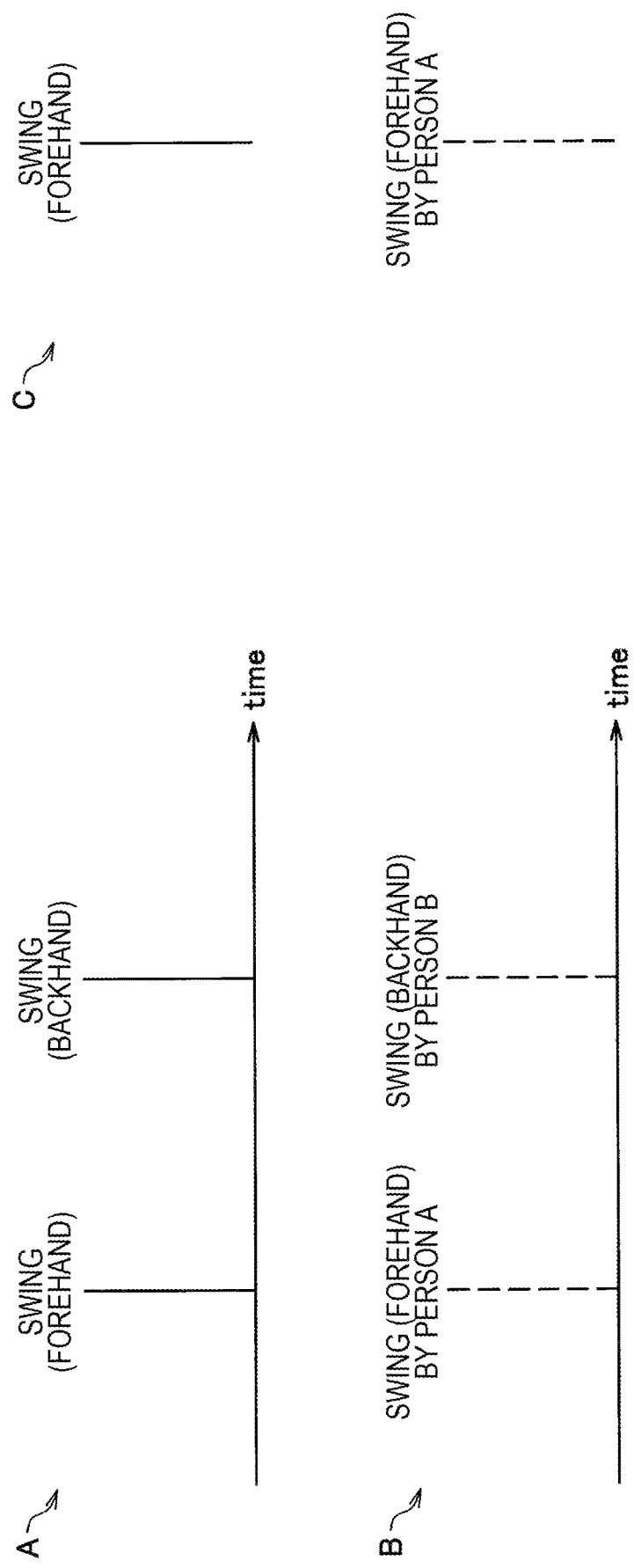
FIG. 6 is an explanatory view illustrating an example of processing of identifying a target according to an information processing method of the present embodiment.

FIG. 6 is an explanatory view illustrating an example of processing of identifying a target in an information processing method according to the present embodiment. A of FIG. 6 illustrates an example of an event detected on the basis of a captured image. B of FIG. 6 illustrates an example of an event detected on the basis of sensor information. Furthermore, C of FIG. 6 illustrates an example of a result of associating an event, detected on the basis of a captured image with an event detected on the basis of sensor information. In FIG. 6, swings of tennis are illustrated as an example of the detected event.

For example, in a case where there are same type of events occurring on the same timepoint, such as "swing (forehand)" detected on the basis of the captured image illustrated in A of FIG. 6 and "swing (forehand)" detected on the basis of sensor information corresponding to Person A (example of target), the information processing apparatus according to the present embodiment associates the event detected on the basis of the captured image with the event detected on the basis of the sensor information, as illustrated in C of FIG. 6. The information processing apparatus according to the present embodiment holds information indicating a result of associating events in a recording medium such as a storage unit (described later), thereby associating the event detected on the basis of the captured image with the event detected on the basis of sensor information, for example.

Furthermore, in a case where a plurality of pieces of information associated with the detected event exists, the information processing apparatus according to the present embodiment, may associate the event detected on the basis of the captured image with the event detected on the basis of the sensor information, on the basis of the plurality of pieces of information associated with the event.

Examples of the information to be associated with the event according to the present embodiment, in an exemplary case where the event is a swing of tennis, include the type of swing (for example, forehand or backhand), strength of swing (strength obtained by acceleration change in the racket, or the like, for example), initial velocity of the ball, and the like. Note that the example of the information associated with the event according to the present embodiment is, of course, not limited to the example described above.

For example, the information processing apparatus according to the present embodiment, uses "a plurality of feature amounts indicated by information associated with an event detected on the basis of the captured image" and "a plurality of feature amounts indicated by information associated with the event detected on the basis of the sensor information", and thereby associates the event detected on the basis of the captured image with the event detected on the basis of the sensor information.

For example, the information processing apparatus according to the present embodiment calculates a weighted square error of a distance between feature amounts, and the like, as a distance between events. Subsequently, in a case where the distance between the calculated events is less than a set threshold or in a case where the distance between the events is the threshold or less, the information processing apparatus according to the present embodiment associates the event detected on the basis of the captured image with the event detected on the basis of sensor information.

Furthermore, in a case where an event performed by a plurality of targets on the same timepoint is detected on the basis of sensor information corresponding to the plurality of targets, the information processing apparatus according to the present embodiment calculates the distance between the events for each of pieces of sensor information corresponding to the plurality of targets. Next, the information processing apparatus according to the present embodiment obtains a combination of an event detected on the basis of the captured image and an event detected on the basis of the sensor information, having a minimum distance between the events, thereby associating the event detected on the basis of the captured image with the event detected on the basis of the sensor information. The information processing apparatus according to the present embodiment uses the Hungarian method, for example, and obtains the combination that minimizes the distance between the events.

The information processing apparatus according to the present embodiment performs the above processing, for example, and thereby identifies a target on the basis of the captured image and the sensor information.

Here, for example, even in a case where a non-determination state occurs, the above processing can identify the target, thereby canceling the non-determination state.

Accordingly, the information processing apparatus according to the present embodiment performs the processing (processing of identifying the target) according to a second information processing method, making it possible to improve the accuracy in tracking the target on the basis of the captured image.

Furthermore, with the improved accuracy in tracking a target on the basis of a captured image, it is possible to further reduce the probability of occurrence of a situation that needs manual correction in target tracking. Accordingly, the information processing apparatus according to the present embodiment performs the processing (processing of identifying the target) according to a second information processing method, making it possible to improve the convenience in tracking the target on the basis of the captured image.

Furthermore, since the target is identified by the processing (processing of identifying the target) according to the second information processing method, the automatic target identification is implemented. In other words, in a case where the processing according to the second information processing method is performed, for example, the user of the information processing apparatus according to the present embodiment does not need to perform predetermined operation for identifying the target, such as operation of assigning identification information. Accordingly, the information processing apparatus according to the present embodiment performs the processing according to the second information processing method, making it possible to improve the convenience in tracking the target on the basis of the captured image.

(3) Processing According to Third Information Processing Method: a Combination of Target Tracking Processing and Target Identification Processing The information processing apparatus according to the present embodiment may perform both of the processing of (1) (target tracking processing) and the processing of (2) (target identification processing) described above.

When both the processing of (1) (target tracking processing) and the processing of (2) (target identification processing) described above are executed, it is possible to exhibit an effect to be achieved each of the processing (1) (target tracking processing) and the processing of (2) (target identification processing) described above.

The information processing apparatus according to the present embodiment performs, as processing according to the information processing method of the present embodiment, for example, any of the processing of (1) (target tracking processing) and the processing of (2) (target identification processing), and processing of (3) (combination of the target tracking processing and target identification processing) described above, thereby improving accuracy in tracking the target on the basis of the captured image.

Note that each of the processing of (1) (target tracking processing), the processing of (2) (target identification processing), and the processing of (3) (combination of the target tracking processing and target identification processing) is a result of dividing the processing according to the information processing method of the present embodiment, for convenience. Therefore, individual processing according to the information processing method of the present embodiment can also be regarded as two or more types of processing, for example, depending on the certain dividing method.

(Information Processing System According to the Present Embodiment)

Next, the following is an example of the information processing system according to the present embodiment to which the above-described information processing method according to the present embodiment is applied.

Figure 7:
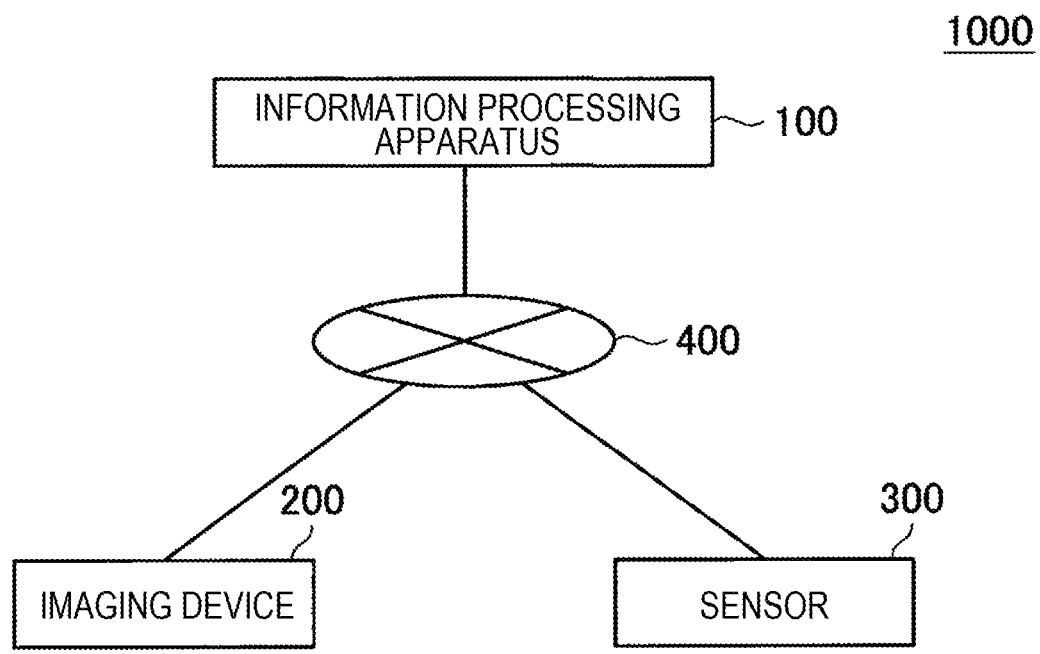
FIG. 7 is an explanatory view illustrating an example of an information processing system according to the present embodiment to which an information processing method according to the present embodiment is applied.

FIG. 7 is an explanatory view illustrating an example of an information processing system 1000 according to the present embodiment to which an information processing method according to the present embodiment is applied.

The information processing system 1000 includes an information processing apparatus 100, imaging device(s) 200, . . . , and a sensor 300, for example.

Note that although FIG. 7 illustrates one imaging device 200, the information processing system according to the present embodiment may have a plurality of the imaging devices 200. In a case where the information processing system according to the present embodiment includes the plurality of imaging devices 200, some of the plurality of imaging devices 200 may be imaging devices included in the information processing apparatus 100.

Furthermore, although FIG. 7 illustrates one sensor 300, the information processing system according to the present embodiment may have a plurality of the sensors 300. In the case where the information processing system according to the present embodiment has a plurality of sensors, each of the sensors senses each of the targets corresponding to each of the sensors, for example. Furthermore, in the case where the information processing system according to the present embodiment has a plurality of sensors, a plurality of the sensors 300 may correspond to one target.

Hereinafter, an apparatus constituting the information processing system 1000 will be described with the information processing system 1000 illustrated in FIG. 7 as an example.

The information processing apparatus 100, the imaging device 200, and the sensor 300 are interconnected by wireless or wired, for example, via a network 400. Examples of the network 400 include a wired network such as a local area network (LAN) or a wide area network (WAN), a wireless network such as a wireless local area network (WLAN), the Internet using a communication protocol such as the Transmission Control Protocol/Internet Protocol (TCP/IP), or the like. Note that the information processing system according to the present embodiment enables direct communication between the information processing apparatus 100, and the imaging device 200 and the sensor 300, rather than via the network 400.

[1] Imaging Device 200

The imaging device 200 images a region including an imageable range of a target, such as "court or ground (an exemplary case where the purpose is sport game analysis)", or "a space to undergo crime prevention measures (an example of crime prevention purpose), for example. One or both of the position and attitude of the imaging device 200 may be fixed or may be variable.

The imaging device 200 includes a lens/imaging element and a signal processing circuit, for example. The lens/imaging element includes: a lens of an optical system; and an image sensor using a plurality of imaging elements such as a complementary metal oxide semiconductor (CMOS), for example. The signal processing circuit includes an automatic gain control (AGC) circuit and an analog to digital converter (ADC), for example, and converts an analog signal generated by the imaging element into a digital signal (image data). Furthermore, the signal processing circuit performs various types of processing related to RAW development, for example. Furthermore, the signal processing circuit may perform various types of signal processing such as white balance correction processing, color tone correction processing, gamma correction processing, YCbCr conversion processing, or edge emphasis processing, for example.

Note that the configuration of the imaging device 200 is not limited to the above-described example, and it is possible to adopt a configuration according to an application example of the imaging device 200 described later.

[2] Sensor 300

The sensor 300 is a sensor for sensing a target. An example of the sensor 300 may be one, both, or the like of an inertial sensor and a position sensor as described above.

Furthermore, as described above, the sensor 300 is provided on an object (for example, shoes, clothes, an accessory such as a wrist watch, or an arbitrary wearable device) worn on a target person such as a player, or provided in a target object such as a ball, for example.

[3] Information Processing Apparatus 100

The information processing apparatus 100 performs processing according to the information processing method of the present embodiment.

Figure 8:
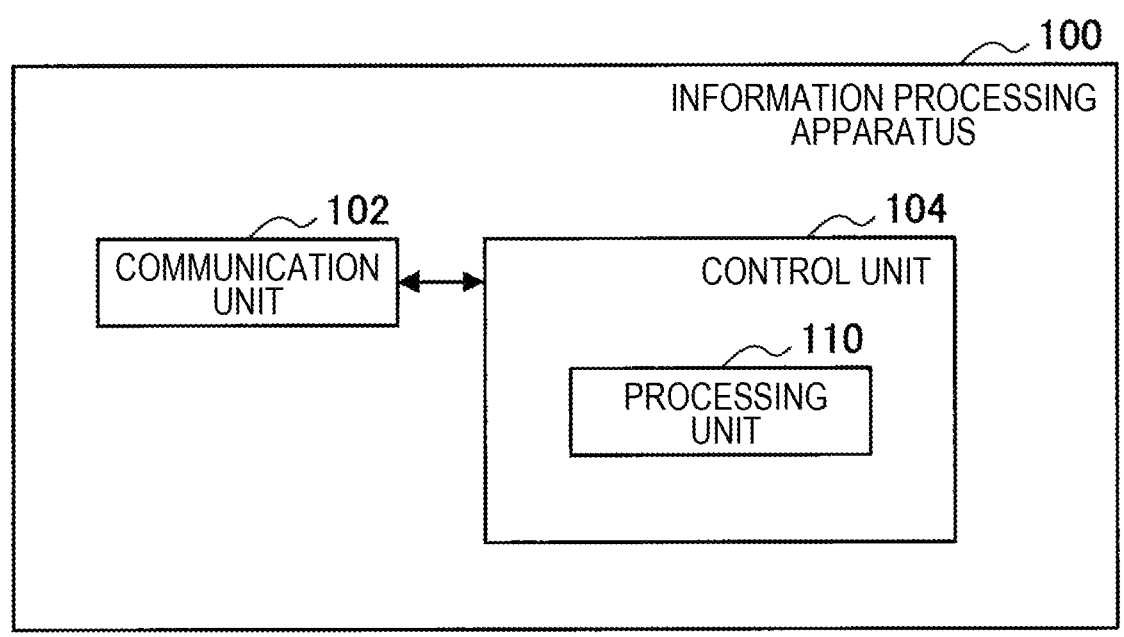
FIG. 8 is a block diagram illustrating an example of a configuration of an information processing apparatus according to the present embodiment.

FIG. 8 is a block diagram illustrating an example of a configuration of the information processing apparatus 100 according to the present embodiment. The information processing apparatus 100 includes a communication unit 102 and a control unit 104, for example.

Furthermore, the information processing apparatus 100 may include, for example, a read only memory (ROM) (not illustrated), a random access memory (RAM) (not illustrated), a storage unit (not illustrated), an operation unit (not illustrated) operable by the user of the information processing apparatus 100, and a display unit (not illustrated) that displays various screens on a display screen. The information processing apparatus 100 connects the above-described individual constituents via a bus as a data transmission path, for example.

The ROM (not illustrated) stores control data such as programs and operation parameters used by the control unit 104. The RAM (not illustrated) temporarily stores programs executed by the control unit 104, or the like.

The storage unit (not illustrated) is a storage means included in the information processing apparatus 100, and stores various data such as data related to the information processing method according to the present embodiment and various applications, for example. Here, examples of the storage unit (not illustrated) include a magnetic recording medium such as a hard disk, a nonvolatile memory such as a flash memory, and the like. Furthermore, the storage unit (not illustrated) may be detachable from the information processing apparatus 100.

An example of the operation unit (not illustrated) is an operation input device to be described later. Furthermore, an example of the display unit (not illustrated) may be a display device described later.

[Hardware Configuration Example of Information Processing Apparatus 100]

Figure 9:
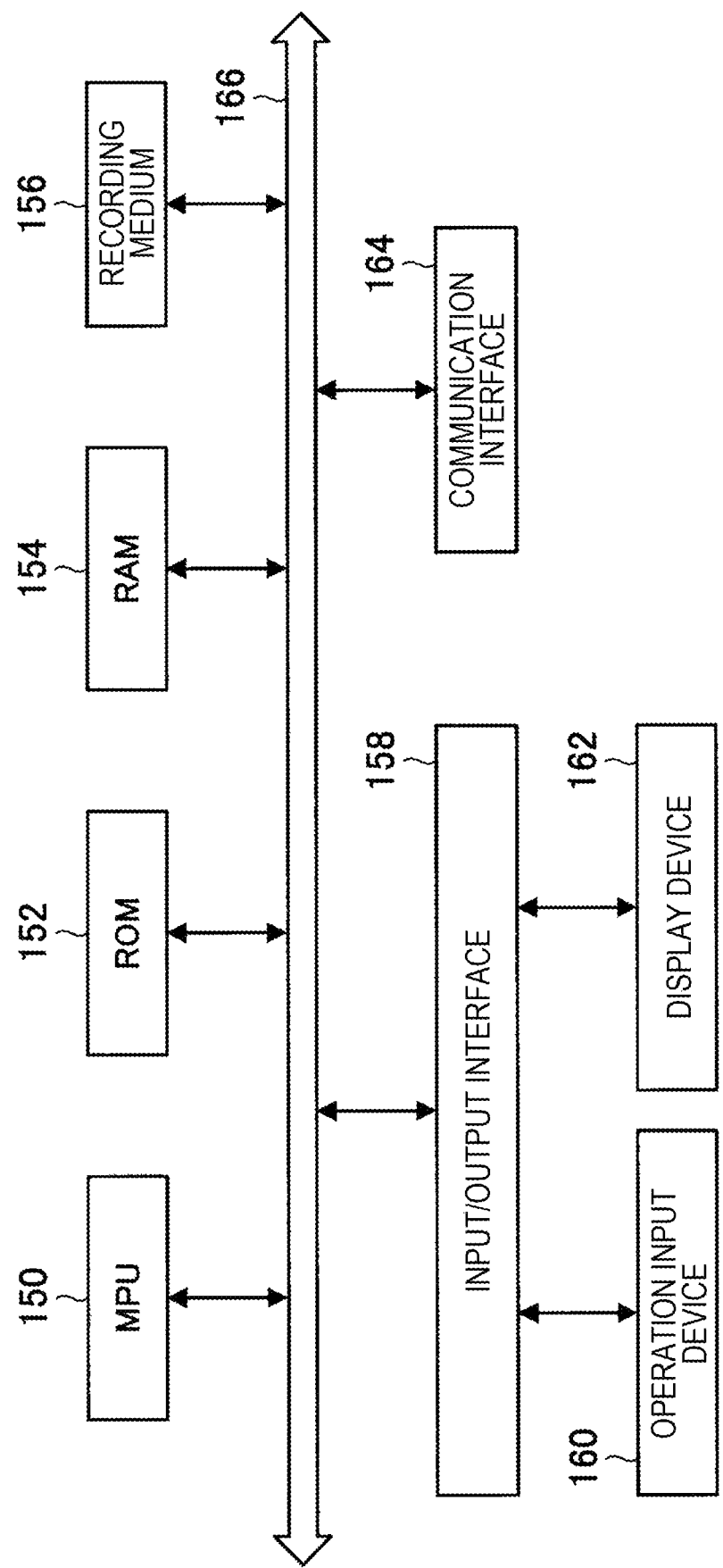
FIG. 9 is an explanatory diagram illustrating a hardware configuration of the information processing apparatus according to the present embodiment.

FIG. 9 is an explanatory diagram illustrating a hardware configuration of the information processing apparatus 100 according to the present embodiment. The information processing apparatus 100 includes an MPU 150, a ROM 152, a RAM 154, a recording medium 156, an input/output interface 158, an operation input device 160, a display device 162, and a communication interface 164, for example. Furthermore, the information processing apparatus 100 connects the individual constituents via a bus 166 as a data transmission path, for example. Furthermore, the information processing apparatus 100 is driven by power supplied from an internal power supply such as a battery provided in the information processing apparatus 100, electric power supplied from an external power supply connected to the apparatus, or the like, for example.

The MPU 150 includes one or two or more processors having arithmetic circuits such as micro processing unit (MPU), various processing circuits, and the like, and functions as the control unit 104 that performs overall control of the information processing apparatus 100, for example. Furthermore, in the information processing apparatus 100, the MPU 150 also functions as a processing unit 110 to be described later, for example. Note that the processing unit 110 may include a dedicated (or general-purpose) circuit (for example, a processor separate from the MPU 150, or the like).

The ROM 152 stores control data such as programs, operation parameters, and the like used by the MPU 150. The RAM 154 temporarily stores programs executed by the MPU 150, and the like, for example.

The recording medium 156 functions as a storage unit (not illustrated), and stores various data such as data related to the information processing method according to the present embodiment and various applications, for example. Here, examples of the recording medium 156 include a magnetic recording medium such as a hard disk and a nonvolatile memory such as a flash memory. Furthermore, the recording medium 156 may be detachable from the information processing apparatus 100.

The input/output interface 158 connects to the operation input device 160 and the display device 162, for example. The operation input device 160 functions as an operation unit (not illustrated). The display device 162 functions as a display unit (not illustrated). Here, examples of the input/output interface 158 include a universal serial bus (USB) terminal, a digital visual interface (DVI) terminal, a High-Definition Multimedia Interface (HDMI) (registered trademark) terminal, various processing circuits, and the like.

Furthermore, the operation input device 160 is provided on the information processing apparatus 100, for example, and is connected to the input/output interface 158 inside the information processing apparatus 100. Examples of the operation input device 160 include buttons, direction keys, rotary selectors such as a jog dial, combinations of these devices, and the like.

Furthermore, the display device 162 is provided on the information processing apparatus 100, for example, and is connected to the input/output interface 158 inside the information processing apparatus 100. Examples of the display device 162 include a liquid crystal display and an organic electroluminescence (EL) display (also referred to as an organic light emitting diode (OLED) display).

Note that the input/output interface 158 can, of course, be connected to an external device such as an operation input device (for example, a keyboard, a mouse, etc.) external to the information processing apparatus 100 or an external display device. Furthermore, the display device 162 may be a device capable of display and user operation, such as a touch panel, for example.

The communication interface 164 is a communication means provided in the information processing apparatus 100 and functions as a communication unit 102 for performing wireless or wired communication with external devices such as the imaging device 200 or the sensor 300, an external apparatus such as a server, or the like, via the network 400 (or directly). Here, examples of the communication interface 164 include: a communication antenna and a radio frequency (RF) circuit (wireless communication); an IEEE 802.15.1 port and a transmission/reception circuit (wireless communication); an IEEE 802.11 port and a transmission/reception circuit (wireless communication); a local area network (LAN) terminal and a transmission/reception circuit (wired communication); or the like. Furthermore, the communication interface 164 may have any configuration compatible with the network 400.

The information processing apparatus 100 performs the processing according to the information processing method of the present embodiment, with the configuration illustrated in FIG. 9, for example. Note that the hardware configuration of the information processing apparatus 100 according to the present embodiment is not limited to the configuration illustrated in FIG. 9.

For example, the information processing apparatus 100 may omit the communication interface 164 in the case of communicating with an external apparatus or the like via an external communication device connected to the apparatus. Furthermore, the communication interface 164 may have a configuration capable of communicating with one or two or more external apparatuses or the like by a plurality of communication schemes.

Furthermore, the information processing apparatus 100 may further include an imaging device that functions as the imaging device 200 in the information processing system 1000, for example. In a case where the information processing apparatus 100 includes an imaging device, the imaging device functions as an imaging unit (not illustrated) that generates captured images (moving images or still images) by imaging.

Furthermore, the information processing apparatus 100 can be configured without the recording medium 156, the operation input device 160, or the display device 162, for example.

Furthermore, the information processing apparatus 100 can have a configuration corresponding to an application example of the information processing apparatus 100 to be described later, for example.

Furthermore, for example, part or all of the configuration illustrated in FIG. 9 (or the configuration according to the modification) may be implemented by one or more than one integrated circuits (IC).

An example of the configuration of the information processing apparatus 100 will be described again with reference to FIG. 8. The communication unit 102 is a communication means provided in the information processing apparatus 100 and performs wireless or wired communication with external apparatuses such as the imaging device 200 and the sensor 300 via the network 400 (or directly). Furthermore, communication performed by the communication unit 102 is controlled by the control unit 104, for example.

Here, examples of the communication unit 102 include: a communication antenna and an RF circuit; a LAN terminal and a transmission/reception circuit; and the like. However, the configuration of the communication unit 102 is not limited to the above. For example, the communication unit 102 can adopt a configuration compatible with an arbitrary standard capable of communicating with a USB terminal, a transmission/reception circuit, or the like, or any configuration capable of communicating with an external apparatus via the network 400. Furthermore, the communication unit 102 may have a configuration capable of communicating with one or two or more external apparatuses or the like by a plurality of communication schemes.

The control unit 104 includes an MPU or the like, for example, and performs overall control of information processing apparatus 100. Furthermore, the control unit 104 includes the processing unit 110, for example, and plays a leading role in performing processing according to the information processing method of the present embodiment.

The processing unit 110 performs any of the processing of (1) (target tracking processing), the processing of (2) (target identification processing), and the processing of (3) (combination of the target tracking processing and target identification processing) described above, as processing according to the information processing method of the present embodiment, for example.

In the case of performing the processing of (1) (target tracking processing), the processing unit 110 tracks the target identified on the basis of the captured image and the sensor information.

Furthermore, in the case of performing the processing of (2) (target identification processing), the processing unit 110 identifies the target on the basis of the captured image and the sensor information.

Furthermore, in the case of performing the processing of (3) (combination of the target tracking processing and target identification processing), the processing unit 110 tracks the target identified on the basis of the captured image and the sensor information, and tracks a target identified on the basis of the captured image and the sensor information.

The control unit 104 includes the processing unit 110, for example, and therefore plays a leading role in performing the processing according to the information processing method of the present embodiment.

Note that the configuration of the control unit 104 is not limited to the example illustrated in FIG. 8. For example, the control unit 104 can be configured in accordance with the method of dividing the processing according to the information processing method of the present embodiment.

With the configuration illustrated in FIG. 8, for example, the information processing apparatus 100 performs processing according to the information processing method of the present embodiment (any of the processing of (1) (target tracking processing), the processing of (2) (target identification processing), and the processing of (3) (combination of the target tracking processing and target identification processing), for example). Accordingly, with the configuration illustrated in FIG. 8, for example, the information processing apparatus 100 can improve the accuracy in tracking the target on the basis of the captured image.

Furthermore, for example, with the configuration illustrated in FIG. 8, the information processing apparatus 100 can achieve the effect obtained by performing the processing according to the information processing method of the present embodiment as described above.

Note that the configuration of the information processing apparatus according to the present embodiment is not limited to the configuration illustrated in FIG. 8.

For example, in the information processing apparatus according to the present embodiment, the processing unit 110 illustrated in FIG. 8 can be provided separately from the control unit 104 (for example, implemented by another processing circuit).

Furthermore, the configuration for implementing the processing according to the information processing method of the present embodiment is not limited to the configuration illustrated in FIG. 8. It is possible to adopt a configuration corresponding to the method of dividing the processing according to the information processing method of the present embodiment.

Furthermore, for example, in the case of communicating with an external apparatus via an external communication device having similar functions and configurations to the communication unit 102, the information processing apparatus according to the present embodiment can omit the communication unit 102.

[4] Application Example of Individual Apparatuses Constituting the Information Processing System According to the Present Embodiment As described above, while the information processing apparatus has been described as a constituent of the information processing system according to the present embodiment, the present embodiment is not limited to this mode. The present embodiment can be applied to various devices capable of performing processing according to the information processing method of the present embodiment, for example, to a computer such as a personal computer (PC) or a server, a "tablet type device", a "game device", "a camera such as a digital still camera or a digital video camera", or the like. Furthermore, the present embodiment can also be applied to a processing IC that can be incorporated in the above-described device, for example.

Furthermore, the information processing apparatus according to the present embodiment may be applied to a processing system on the premise of connection to a network (or communication between devices) such as cloud computing, for example. An example of the processing system in which the processing according to the information processing method of the present embodiment is performed is a "one apparatus included in the processing system performs a part of the processing according to the information processing method of the present embodiment, while another apparatus included in the processing system performs processing other than the part of the processing according to the information processing method of the present embodiment", for example.

Furthermore, while the imaging device has been described as a constituent of the information processing system according to the present embodiment, the present embodiment is not limited to this mode. The present embodiment is applicable to any device having an imaging function, for example, a "camera such as a digital still camera or a digital video camera", a "communication device capable of imaging with a smartphone, a cellular phone, or the like", a "tablet device capable of imaging", "a game machine capable of imaging", and the like. Furthermore, as described above, in the information processing system according to the present embodiment, the information processing apparatus according to the present embodiment may serve as an imaging device.

Furthermore, although the sensor has been described as a constituent of the information processing system according to the present embodiment, the present embodiment is not limited to this mode. The present embodiment is applicable to any device having a function of sensing the target, such as "various wearable devices worn on the user's body, such as a head mounted display, an eyewear type device, a clock type device, a bracelet type device", "a device attached to an object such as a tag in use", and "an apparatus embedded in a living body in use", for example.

(Program According to the Present Embodiment)

Execution of a program for causing a computer system to function as an information processing apparatus according to the present embodiment (for example, program capable of executing processing according to the information processing method of the present embodiment, such as any of: the processing (target tracking processing) in the above (1); the processing (target identification processing) in the above (2); and the processing (combination of the target tracking processing and the target identification processing) in the above (3)) by a processor or the like on the computer system would be able to improve the accuracy in tracking the target on the basis of the captured image. Here, the computer system according to the present embodiment may be a single computer or a plurality of computers. The computer system according to the present embodiment performs a series of processing according to the information processing method of the present embodiment.

Furthermore, with execution of the program for causing the computer system to function as the information processing apparatus according to the present embodiment by the processor or the like in the computer system, it is possible to achieve the effect to be achieved by the processing according to the information processing method of the present embodiment.

Hereinabove, the preferred embodiments of the present disclosure have been described above with reference to the accompanying drawings, while the technical scope of the present disclosure is not limited to the above examples. A person skilled in the art in the technical field of the present disclosure may find it understandable to reach various alterations and modifications within the technical scope of the appended claims, and it should be understood that they will naturally come within the technical scope of the present disclosure.

For example, the above includes description that a program (computer program) for causing the computer system to function as the information processing apparatus according to the present embodiment is provided. The present embodiment furthermore provides a recording medium storing the above-described program.

The configuration described above is merely an example of the present embodiment and naturally falls within the technical scope of the present disclosure.

In addition, the effects described in this specification are merely illustrative or exemplary, and are not limiting. That is, the technology according to the present disclosure can exhibit other effects obvious to those skilled in the art from the description of the present specification together with the above effects or in place of the above effects.

Note that the following configuration should also be within the technical scope of the present disclosure.

(1)

An information processing apparatus including a processing unit that tracks a target on the basis of a captured image that has been captured by an imaging device and sensor information obtained by communication from a sensor that senses the target.

(2)

The information processing apparatus according to (1), in which the processing unit detects a trajectory of the target to which identification information is assigned, to track the target.

(3)

The information processing apparatus according to (1) or (2),
in which the processing unit
tracks the target on the basis of the captured image, and
tracks the target on the basis of the sensor information in a case where tracking cannot be performed on the basis of the captured image.

(4)

The information processing apparatus according to (3), in which, after the target enters a non-determination state in which identification information assigned to the target cannot be determined on the basis of the captured image, the processing unit newly assigns identification information to the target on the basis of the sensor information and tracks the target.

(5)

The information processing apparatus according to (4), in which the processing unit judges that the target is in the non-determination state in a case where a distance between the target to which identification information is assigned and another target is a set threshold or less, or in a case where the distance is less than the threshold.

(6)

The information processing apparatus according to (5), in which, in a case where the distance is greater than the threshold after the target is judged to be in the non-determination state or in a case where the distance is the threshold or more after the target is judged to be in the non-determination state, the processing unit newly assigns identification information to the target on the basis of the sensor information.

(7)

The information processing apparatus according to any one of (3) to (6), in which, in a case where the target is in a non-detection state in which the target cannot be detected on the basis of the captured image, the processing unit interpolates the trajectory of the target on the basis of the sensor information to track the target.

(8)

The information processing apparatus according to any one of (1) to (7), in which the processing unit identifies the target on the basis of the captured image and the sensor information.

(9)

The information processing apparatus according to (8), in which the processing unit associates an event detected on the basis of the captured image with an event detected on the basis of the sensor information, to identify the target.

(10)

The information processing apparatus according to any one of (1) to (9), in which the sensor is a sensor that senses a position of the target or movement of the target.

(11)

The information processing apparatus according to (10), in which the sensor is a position sensor or an inertial sensor.

(12)

An information processing apparatus including a processing unit that identifies a target on the basis of a captured image that has been captured by an imaging device and sensor information obtained by communication from a sensor that senses the target.

(13)

An information processing method to be executed by an information processing apparatus, the method including a step of tracking a target on the basis of a captured image that has been captured by the imaging device and sensor information obtained by communication from a sensor that senses the target.

(14)

The information processing method according to (13), in which in the step of tracking the target is tracked on the basis of the captured image, and the target is tracked on the basis of the sensor information in a case where tracking cannot be performed on the basis of the captured image.

(15)

An information processing method to be executed by an information processing apparatus, the method including a step of identifying a target on the basis of a captured image that has been captured by the imaging device and sensor information obtained by communication from a sensor that senses the target.

(16)

The information processing method according to (15), in which in the step of identifying, an event detected on the basis of the captured image is associated with an event detected on the basis of the sensor information, to identify the target.

(17)

An information processing system including:
an imaging device;
a sensor that senses a target; and
an information processing apparatus including a processing unit that tracks the target on the basis of a captured image that has been captured by the imaging device and sensor information obtained by communication from the sensor.

REFERENCE SIGNS LIST

100 Information processing apparatus
102 Communication unit
104 Control unit
110 Processing unit
200 Imaging device
300 Sensor
400 Network
1000 Information processing system.

The invention claimed is:

1. An information processing apparatus comprising:
circuitry configured to
track a target on a basis of at least one of a captured image that has been captured by an imaging device and non-image sensor information sensed by a sensor that senses the target, wherein the circuitry:
tracks the target on a basis of the captured image in a case where tracking can be performed on a basis of the captured image,
tracks the target only on a basis of the non-image sensor information in a case where the tracking cannot be performed on a basis of the captured image, and
tracks the target by synthesizing a trajectory of the target obtained on the basis of the non-image sensor information during a non-detection state in which the target cannot be detected based on the captured image, and a trajectory of the target detected based on the captured image during a detection state in which the target can be detected based on the captured image.

2. The information processing apparatus according to claim 1, wherein the circuitry detects the trajectory of the target to which the identification information is assigned, to track the target.

3. The information processing apparatus according to claim 1, wherein, after the target enters a non-determination state in which identification information assigned to the target cannot be determined on a basis of the captured image, the circuitry newly assigns identification information to the target on a basis of the non-image sensor information and tracks the target.

4. The information processing apparatus according to claim 3, wherein the circuitry judges that the target is in the non-determination state in a case where a distance between the target to which the identification information is assigned and the other target is less than the predetermined threshold.

5. The information processing apparatus according to claim 4, wherein, in a case where the distance is greater than the predetermined threshold after the target is judged to be in the non-determination state or in a case where the distance is equal to the predetermined threshold or more after the target is judged to be in the non-determination state, the circuitry newly assigns identification information to the target on a basis of the non-image sensor information.

6. The information processing apparatus according to claim 1, wherein the circuitry identifies the target on a basis of the captured image and the non-image sensor information.

7. The information processing apparatus according to claim 6, wherein the circuitry associates an event detected on a basis of the captured image with an event detected on a basis of the non-image sensor information, to identify the target.

8. The information processing apparatus according to claim 1, wherein the sensor senses a position of the target or movement of the target.

9. The information processing apparatus according to claim 8, wherein the sensor is a position sensor or an inertial sensor.

10. The information processing apparatus according to claim 1, wherein the sensor is disposed on the target.

11. The information processing apparatus according to claim 1, wherein the non-image sensor information is not used to track the target when the target is detected in the captured image.

12. An information processing apparatus comprising:
   circuitry configured to
   identify a target on a basis of at least one of a captured image that has been captured by an imaging device and non-image sensor information sensed by a sensor that senses the target, wherein the circuitry:
      identifies the target on a basis of the captured image in a case where the target can be detected on a basis of the captured image,
      identifies the target only on a basis of the non-image sensor information in a case where the target cannot be detected on a basis of the captured image, and
      identifies the target by synthesizing a trajectory of the target obtained on the basis of the non-image sensor information during a non-detection state in which the target cannot be detected based on the captured image, and a trajectory of the target detected based on the captured image during a detection state in which the target can be detected based on the captured image.

13. An information processing method to be executed by an information processing apparatus, the method comprising:
   identifying, with circuitry, a target on a basis of at least one of a captured image that has been captured by an imaging device and non-image sensor information sensed by a sensor that senses the target; and
   tracking, with the circuitry, the target on a basis of the captured image that has been captured by the imaging device and the non-image sensor information obtained by communication from the sensor that senses the target, wherein tracking the target includes:
      tracking the target on a basis of the captured image in a case where tracking can be performed on a basis of the captured image,
      tracking the target only on a basis of the non-image sensor information in a case where the tracking cannot be performed on a basis of the captured image, and
      tracking the target by synthesizing a trajectory of the target obtained on the basis of the non-image sensor information during a non-detection state in which the target cannot be detected based on the captured image, and a trajectory of the target detected based on the captured image during a detection state in which the target can be detected based on the captured image.

14. An information processing method to be executed by an information processing apparatus, the method comprising:
   identifying, with circuitry, a target on a basis of a captured image that has been captured by an imaging device and non-image sensor information sensed by a sensor that senses the target; and
   tracking the target based on at least one of the captured image and the non-image sensor information, wherein tracking the target includes:
      tracking the target on a basis of the captured image in a case where tracking can be performed on a basis of the captured image,
      tracking the target only on a basis of the non-image sensor information in a case where the tracking cannot be performed on a basis of the captured image, and
      tracking the target by synthesizing a trajectory of the target obtained on the basis of the non-image sensor information during a non-detection state in which the target cannot be detected based on the captured image, and a trajectory of the target detected based on the captured image during a detection state in which the target can be detected based on the captured image.

15. The information processing method according to claim 14, wherein identifying the target includes associating an event detected on a basis of the captured image with an event detected on a basis of the non-image sensor information, to identify the target.

16. An information processing system comprising:
   an imaging device;
   a sensor that senses a target; and
   an information processing apparatus including circuitry that tracks the target on a basis of at least one of a captured image that has been captured by the imaging device and non-image sensor information sensed by the sensor, wherein the circuitry of the information processing apparatus:
      tracks the target on a basis of the captured image in a case where tracking can be performed on a basis of the captured image,
      tracks the target only on a basis of the non-image sensor information in a case where the tracking cannot be performed on a basis of the captured image, and
      tracks the target by synthesizing a trajectory of the target obtained on the basis of the non-image sensor information during a non-detection state in which the target cannot be detected based on the captured image, and a trajectory of the target detected based on the captured image during a detection state in which the target can be detected based on the captured image.

* * * * *